（12) United States Patent
Aschoff et al.

(10) Patent No.: US 6,315,332 B1
(45) Date of Patent: Nov. 13, 2001

(54) FLEXIBLE LINE ELEMENT

(75) Inventors: Wolfgang Aschoff, Wald-Michelbach; Georg Salzer, Waghäusel, both of (DE)

(73) Assignee: IWK Regler und Kompensatoren GmbH, Stutensee (DE)

( * ) Notice: Subject to any disclaimer, the term of this patent is extended or adjusted under 35 U.S.C. 154(b) by 0 days.

(21) Appl. No.: 09/321,579

(22) Filed: May 28, 1999

(30) Foreign Application Priority Data

May 29, 1998 (DE) ............................................. 198 24 095

(51) Int. Cl.⁷ ....................................................... F16L 51/02
(52) U.S. Cl. ............................................ 285/227; 285/226
(58) Field of Search ..................................... 285/226, 227, 285/228, 299; 92/37, 34

(56) References Cited

U.S. PATENT DOCUMENTS

| | | | | |
|---|---|---|---|---|
| 3,051,515 | * | 8/1962 | Graves | 285/228 |
| 3,318,335 | * | 5/1967 | Heller . | |
| 3,766,834 | * | 10/1973 | Kraemer | 92/35 |
| 4,026,110 | * | 5/1977 | Engström | 60/592 |
| 5,397,157 | * | 3/1995 | Hempel et al. | 285/227 |
| 5,538,294 | * | 7/1996 | Thomas | 285/226 |

FOREIGN PATENT DOCUMENTS

1401419 * 4/1965 (FR) ..................................... 285/228

* cited by examiner

*Primary Examiner*—Teri Pham Luu
(74) *Attorney, Agent, or Firm*—Antonelli, Terry, Stout & Kraus, LLP

(57) ABSTRACT

The invention is a flexible line element, particularly for exhaust pipes of internal combustion engines of motor vehicles. At least two interconnected, metal bellows are provided with cylindrical joining ends and at least one of the bellows may be helically corrugated. The bellows may be telescoped. The two bellows, whether in line or telescoped, are connected at only one of their joining ends. A line element of the invention is on the one hand torsion-soft to not transfer any torsional stresses to adjacent components, and on the other is also stable in the case of high torsional stresses.

19 Claims, 2 Drawing Sheets

FLEXIBLE LINE ELEMENT

BACKGROUND OF THE INVENTION

1. Field of the Invention

The invention relates to a flexible line element, particularly for exhaust pipes of internal combustion engines of motor vehicles.

2. Description of the Prior Art

Flexible line elements arc e.g. incorporated as adaptors into the exhaust pipe of a motor vehicle, which is installed on the vehicle floor, in order to absorb movements and vibrations and prevent the transfer thereof to adjacent components, such as arise due to elastically mounted driving engines, vehicle faults, temperature-caused length changes, etc. They generally comprise a helically or annularly corrugated metal bellows, together with further elements, such as line and/or support elements, together with additional elements for supporting and/or increasing stability, e.g. metal gauze, or damping elements, so that if vibrations are excited in the resonant frequency range of the bellows movement increases of the latter are prevented, because they could lead to a reduction of the service life and to interaction with other components for noise production purposes.

In many cases flexible line elements of this type are exposed to torsional stresses. If the bellows of such line elements has a torsion-stiff construction, such as e.g. a parallel bellows, although such torsional stresses do not lead to its failure, they are transferred in undesired manner to adjacent components. If the bellows is torsion-soft, it is suitable for the decoupling of adjacent components, but in particular dynamic torsional stresses can lead to its failure. It is stressed in this connection that in the case of dynamic stressing a metallic material is subject to earlier fatigue than with static stressing, the stresses to which a line element in the exhaust pipe of a vehicle is exposed being more particularly of a dynamic nature.

Thus, on the basis of a line element of the aforementioned type, one object of the invention is to provide a line element that is compact and especially may have short axial extension. A further object of the invention is to provide the line element on the one hand to be torsion-soft, so that it does not transfer torsional stresses to adjacent components, but on the other that the line element does not fail when high torsional stresses occur.

SUMMARY OF THE INVENTION

According to the invention, the problem of the prior art is solved in the case of a line element of the aforementioned type in that there are at least two interconnected metal bellows provided with cylindrical joining ends and at least one of the bellows is a helically corrugated bellows and/or the bellows are telescoped and the two bellows are connected at only one of their joining ends. One joining end of a first bellows is firmly connected to one joining end of the other bellows and the other joining end of the first bellows is firmly connected to one end of a substantially rigid pipe element, the other end of the pipe element serving as one cylindrical joining end of the line element and the other joining end of the outer bellows serving as the other cylindrical joining end of the line element.

The twistability of the inventively designed line element is based on the physical similarity of a helically corrugated metal bellows and a coil spring. If a coil spring is lengthened or shortened, it is subject to a restoring force F, which is proportional to the deflection s, the proportionality factor D being the spring strength;

$$F = D \times s$$

In the case of a deflection s the coil spring starts to twist about its median longitudinal axis, the twisting about the latter being proportional to the deflection. Conversely a coil spring is able to transform a torsional stress into a length change, the restoring which is proportional to the deflection, consequently being proportional to the twisting about the coil spring's median longitudinal axis. Thus, if several coil springs are combined with one another, the individual springs can transform torsional movements into axially directed, translatory movements, the combination of coil springs being able to compensate torsion-induced, translatory movements.

As has already been stated, a helically corrugated bellows behaves in a similar way. In the case of torsional stressing, it transforms the twisting about its median longitudinal axis into a length change and it is subject to a restoring force proportional to the length change. If further axially flexible bellows are combined with a helically corrugated bellows, then there is a decoupling of torsional movements and translatory movements and it is in most cases sufficient to only combine two bellows. At least one bellows must be helically corrugated for transforming the torsion into a length change, whereas the second bellows can either be helically or annularly corrugated for compensating for the length change.

The torsion-softness of the inventive line element can be adjusted via the geometry of the threads of the helically corrugated bellow or bellows. The torsion-softness increases with an increasing number of threads, for a constant thread pitch. In addition, the torsion softness increases with increasing thread pitch for a constant number of threads. If a particularly torsion-soft line element is to be provided, it should consequently have at least one helically corrugated bellows with a large number of threads with a high thread pitch.

In a preferred embodiment, the line element according to the invention has successively arranged bellows, whose diameters are roughly identical and which are interconnected, e.g. by welding at in each case one of the cylindrical joining end there of. As two bellows are generally sufficient for decoupling torsional stresses occurring in the exhaust-pipe of a motor vehicle (namely a helically corrugated bellows for transforming the torsion into a length change and a further helically or annularly corrugated bellows for compensating the length change), it is preferred for cost reasons to use only two bellows as basic components of the line element.

As has already been suggested, according to a variant a helically corrugated bellows is combined with a further helically corrugated bellows. In another variant a helically corrugated bellows is combined with an annularly corrugated bellows. In both cases a torsional deflection at one of the two ends of the arrangement leads to a translatory displacement of the connection point between the bellows due to the transformation of a rotary movement into an axial movement of a helically corrugated bellows, the end of the arrangement opposite to the introduction of the torsional movement remains idle. In order to e.g. compensate the torsion-induced length increase of a helically corrugated bellows by means of the length reduction of a further, series-arranged, helically corrugated bellows, it is particularly appropriate to combine helically corrugated bellows with opposing thread pitch, but the same pitch height in succession so as to form a line element. Thus, e.g. a torsion-induced shortening of one helically corrugated bellows is compensated by the lengthening of the second bellows and a torsional stress acting on a bellows is not transferred in undesired manner in the form of a translatory stress.

According to another preferred embodiment of the inventive line element, there is a parallel arrangement of telescoped bellows, whereof at least one is helically corrugated and are interconnected, preferably in the vicinity of in each case one of their joining ends, e.g. by welding. Thus, a joining end of the inner bellows arranged internally of the line element is firmly connected to one end of the pipe element, whereas the other end of the pipe element arranged internally o f the inner bellows serves as a cylindrical joining end of the line element. In much the same way as for the consecutive arrangement of the bellows, a torsional deflection at one of the two ends of the parallel arrangement leads to a translatory displacement of the connection point between the bellows due to the transformation of the rotary movement into an axial movement of a helically corrugated bellows, whilst the end of the arrangement opposite to the introduction of the torsional movement remains idle.

If the diameters of the telescoped bellows are chosen in such a way that the internal diameter of the outer bellows is larger than the external diameter of the inner bellows, it is only appropriate to combine with one another in each case helically corrugated bellows with the same number of threads and a pitch in the same direction, so that the bellows engage on one another. As a result of the friction of the contacting, helically corrugated bellows, this arrangement leads to a higher torsional stiffness of the line element.

Although fundamentally the helically corrugated bellows can be constructed with one thread, according to a preferred development, the helically corrugated bellows have a multithread construction.

BRIEF DESCRIPTION OF THE DRAWINGS

Embodiments of the arrangement of bellows of a line element according to the invention are described in greater detail hereinafter with reference to the attached drawings, wherein show.

DETAILED DESCRIPTION RELATIVE TO THE DRAWINGS

Figure 1:
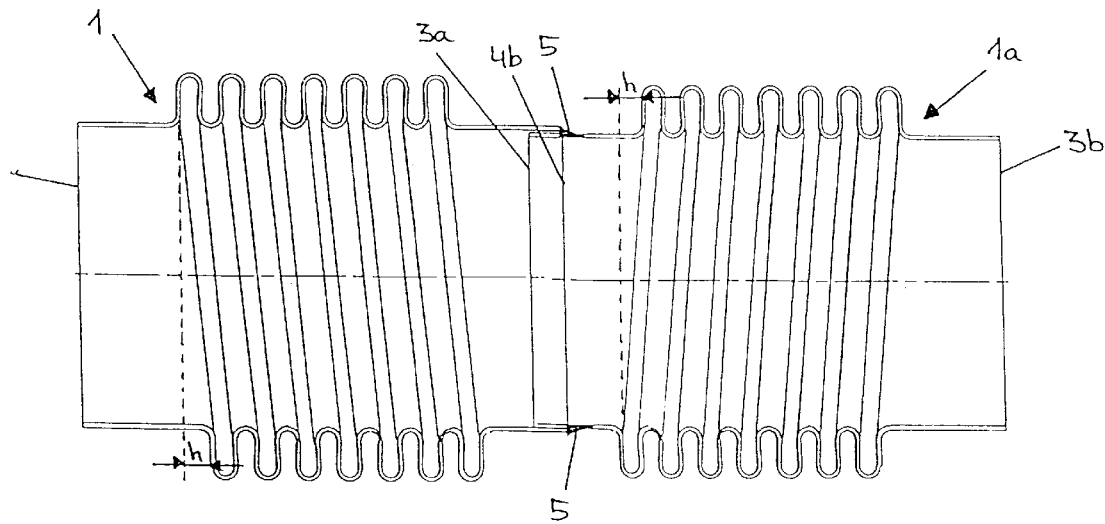
FIG. 1 A line element according to the invention with a consecutive arrangement of two helically corrugated bellows with opposing thread pitch.

FIG. 1 shows a line element according to the invention with a consecutive arrangement of two helically corrugated bellow 1 and 1a with cylindrical joining ends 4a, 4b, 3a, 3b. The ends are interconnected in the vicinity of the joining ends 4a and 3a such as by means of a weld 5, but the line element could also be constructed in one piece. The bellows 1 and 1a have roughly a same size thread pitch h in opposing directions.

A torsional movement acting on a helically corrugated bellows is transformed into a length change, the restoring force forcing the bellows into its inoperative position being proportional to the length change and consequently to the torsion thereof.

If now e.g. the joining end 4a of the bellows 1 is twisted, the connection point 5 of the bellows is axially displaced in translatory manner, because the helically corrugated bellows 1 transforms the torsional movement into a length change. For compensating this length change, e.g. a shortening, the helically corrugated bellows 1a with the opposing thread pitch expands, so that there is no axial movement of the joining end 3b of the line element and consequently no coupling of torsional movements with translatory movements in the axial direction of the line element. With such an arrangement of two helically corrugated bellows 1 and 1a the shortening of one bellows corresponds to the lengthening of the other, the connection point 5 of the bellows being twisted, whilst the joining end of the line element opposite to the introduction of the torsional movement remaining idle.

Figure 2:
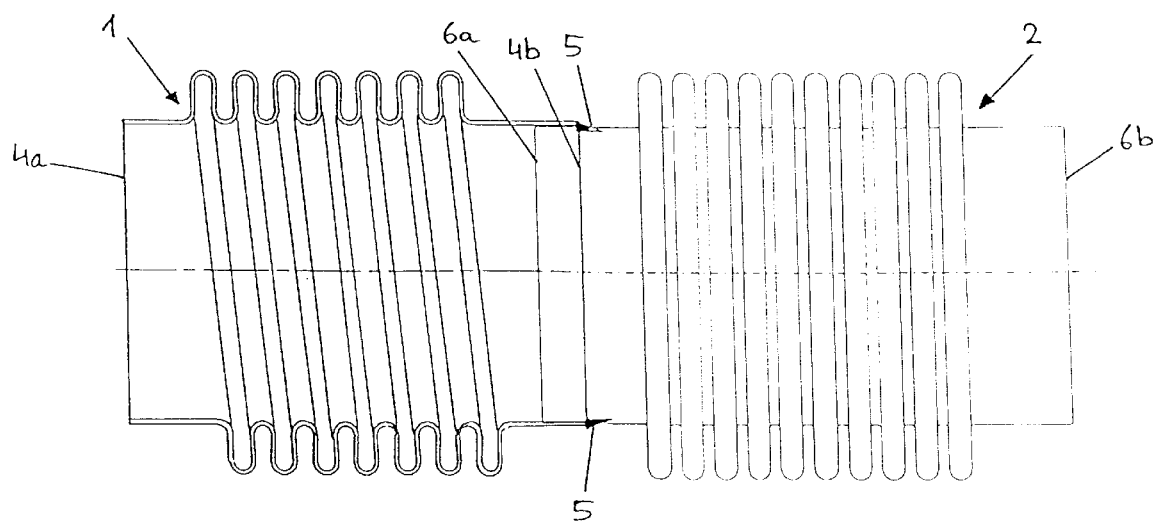
FIG. 2 A line element with a consecutive arrangement of a helically corrugated and an annularly corrugated bellows.

FIG. 2 shows a line element with successive or consecutive arrangements of two bellows of a flexible, twistable line element, firmly interconnected by means of a weld 5 in the area of their cylindrical joining ends 4b and 6a, a helically corrugated bellows 1 being combined with an annularly corrugated bellows 2. In this case with twisting of one joining end of the line element, the helically corrugated bellows 1 e.g. shortens and there is a corresponding lengthening of the annularly corrugated bellows 2, so that although no coupling of torsional movements with translatory movements in the axial direction of the line element takes place, at least part of the torsional stress acting on one joining end of the line element is transferred.

Figure 3:
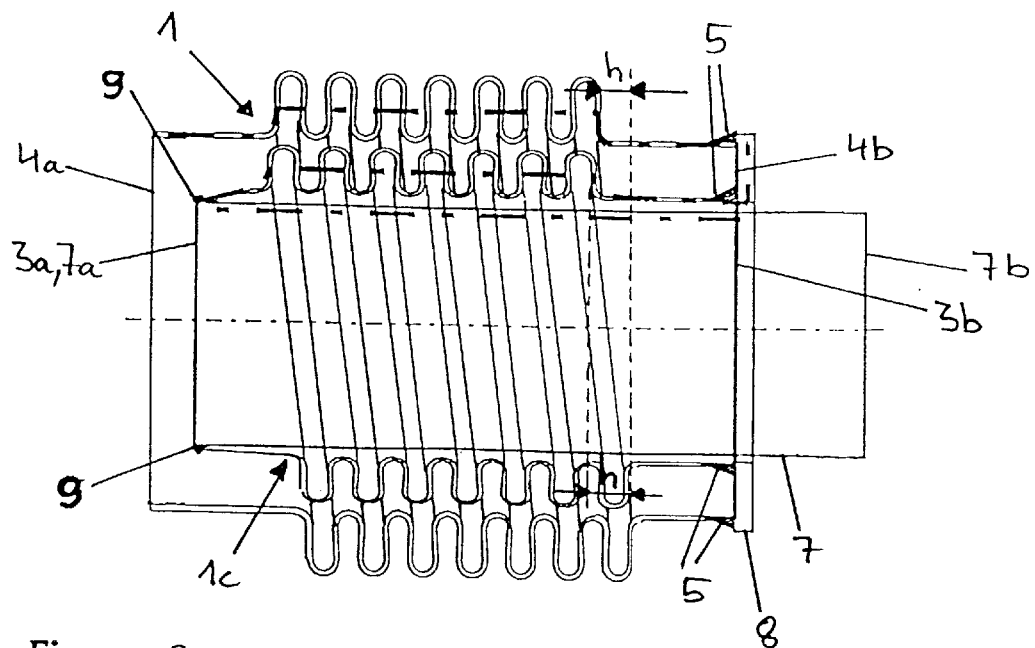
FIG. 3 A line element with a parallel arrangement of two helically corrugated bellows with a large diameter difference.
Figure 4:
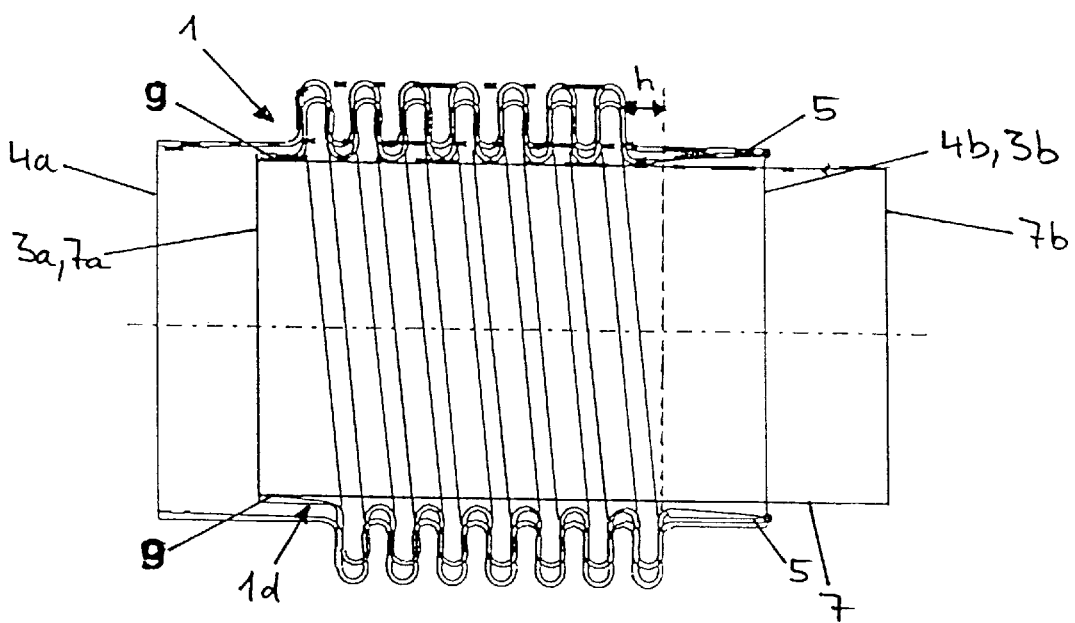
FIG. 4 A line element with a parallel arrangement of two helically corrugated bellows with a small diameter difference.

FIGS. 3 and 4 show line elements with coaxial parallel arrangements of two helically corrugated bellows 1 and 1c (FIG. 3 or 1, 1d (FIG. 4) with different diameters and substantially equal size thread pitch h with the latter in the same direction, so that the bellows are engaged in one another or telescoped. The joining end 4a of the outer bellows 1 serves as one cylindrical joining end of a thus constructed line element and an end 7b of a coaxial pipe element 7 extending through the inner bellow c, 1d remote from the joining end 4a of the outer bellows 1 serves as the other cylindrical joining end 4a of the line element. The end 7a of the pipe element 7 near to the joining end is firmly connected by means of a weld 9 to the end 3a of the inner bellows 1c, 1d near to the joining end 4a of the outer bellows 1.

The remote joining end 3b of the inner bellows 1c is, as shown in FIG. 3, connected by means of a connecting element, e.g. a metal ring, firmly to the other joining end 4b of the outer bellows 1 by welds 5. The internal diameter of the outer bellows 1 is larger than the external diameter of the inner bellows 1c.

According to FIG. 4 the internal diameter of the outer bellows 1 is smaller than the external diameter of the inner bellows 1d, the bellows helixes engaging in one another. In this case the cylindrical joining end 3b of the inner bellows 1d can be directly fixed, e.g. by welds 5, to the joining end 4b of the outer bellows 1.

If now e.g. joining end 4a of outer bellows 1 is twisted, there is a translatory axial displacement of the connection point 5 of the bellows, because the helically corrugated bellows 1 transforms the torsional movement into a length change, e.g. into a shortening. For compensating this shortening, the inner bellows 1c (FIG. 1) or 1d (FIG. 2) having a thread pitch in the same direction lengthens, so that only the connection point 5 of the bellows, but not the joining end 7b of the line element moves axially and torsionally and consequently no coupling of torsional movements and translatory movements takes place in the axial direction on the line end 7*b*.

While the arrangement shown in FIG. 4 has a higher torsional stiffness due to the friction occurring with a relative movement of the bellows 1 and 1*d*, and the arrangement shown in FIG. 3 acts in a more torsion-soft manner and in this case one of the bellows 1 and 1*c* can also be constructed as an annularly corrugated bellows.

What is claimed is:

1. A flexible line element for use in exhaust pipes of internal combustion engines of motor vehicles comprising:
   at least two interconnected metal bellows having cylindrical joining ends with the bellows being successively disposed in line with at least one of the bellows being helically corrugated and at least one other bellows being annularly corrugated.

2. A flexible line element according to claim 1 comprising:
   only two bellows.

3. A flexible line element according to claim 1, wherein:
   the helically corrugated bellows has a thread with an opposing pitch.

4. A line element according to claim 1, wherein:
   at least two bellows have a same thread height.

5. A line element according to claim 1 wherein:
   at least one helically corrugated bellows has a multithread construction.

6. A flexible line element in exhaust pipes of internal combustion engines for motor vehicles comprising:
   at least two interconnected metal bellows having cylindrical joining ends with the bellows being telescoped and connected at only one of the cylindrical joining ends thereof and at least one bellows being helically corrugated; and wherein
   the flexible line element absorbs movement and vibrations when mounted in the exhaust pipe of an internal combustion engine.

7. A flexible line element according to claim 6 comprising:
   only two bellows.

8. A line element according to claim 7, wherein;
   one joining end of an inner bellows is connected to one joining end of an outer bellows and another joining end of the inner bellows is connected to one end of a pipe element, another end of the pipe element is one cylindrical joining end of a line element and another joining end of the outer bellows is the other cylindrical joining end of the line element.

9. A flexible line element according to claim 6 wherein:
   at least one other bellows is annularly corrugated.

10. A line element according to claim 6, wherein:
    at least two of the metal bellows are helically corrugated and have a thread with an opposing pitch.

11. A line element according to claim 6, wherein:
    one joining end of an inner bellows is connected to one joining end of an outer bellows and another joining end of the inner bellows is connected to one end of a pipe element, another end of the pipe element is one cylindrical joining end of a line element and another joining end of the outer bellows is the other cylindrical joining end of the line element.

12. A line element according to claim 11, wherein:
    an internal diameter of the outer bellows is smaller than an external diameter of the inner bellows.

13. A line element according to claim 6, wherein:
    at least two bellows are helically corrugated and have a thread with a pitch in a same direction.

14. A line element according to claim 6, wherein:
    at least two bellows have a same thread height.

15. A line element according to claim 6, wherein:
    an internal diameter of the outer metal bellows is larger than an external diameter of the inner metal bellows.

16. A line element according to claim 6 wherein:
    the at least one helically corrugated bellows has a multithread construction.

17. A flexible line element in exhaust pipes of internal combustion engines for motor vehicles comprising:
    at least two interconnected metal bellows having cylindrical joining ends with the bellows being telescoped and connected at only one of the cylindrical joining ends thereof and an internal diameter of the outer bellows is smaller than an external diameter of the inner bellows.

18. A line element according to claim 17, wherein:
    the at least two bellows are helically corrugated and have a same thread with a same pitch in a same direction.

19. A line element according to claim 17, wherein:
    the at least two bellows are annularly corrugated.

* * * * *